(12) United States Patent
Suzuki

(10) Patent No.: US 8,132,923 B2
(45) Date of Patent: Mar. 13, 2012

(54) COOLING DEVICE AND IMAGE PROJECTION APPARATUS HAVING THE SAME

(75) Inventor: Ryuji Suzuki, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 579 days.

(21) Appl. No.: 12/117,822

(22) Filed: May 9, 2008

(65) Prior Publication Data

US 2008/0284985 A1 Nov. 20, 2008

(30) Foreign Application Priority Data

May 16, 2007 (JP) .................................. 2007-130311

(51) Int. Cl.
*G03B 21/26* (2006.01)

(52) U.S. Cl. ................ 353/58; 353/20; 353/31; 353/34; 353/37; 353/57; 353/60; 353/61; 353/100; 353/119; 353/122; 359/5; 359/6; 359/7; 359/8; 359/9

(58) Field of Classification Search ..................... 353/20, 353/31, 34, 37, 57, 58, 60, 61, 100, 119, 353/122; 349/5, 6, 7, 8, 9; 362/373, 294, 362/345
See application file for complete search history.

(56) References Cited

U.S. PATENT DOCUMENTS

| | | | |
|---|---|---|---|
| 6,139,154 A * | 10/2000 | Haba | 353/31 |
| 6,481,854 B1 | 11/2002 | Sugawara et al. | |
| 6,623,123 B2 * | 9/2003 | Eguchi et al. | 353/30 |
| 7,018,049 B2 * | 3/2006 | Wu et al. | 353/58 |
| 7,140,739 B2 * | 11/2006 | Ogawa et al. | 353/119 |
| 7,380,965 B2 * | 6/2008 | Nakashita | 362/373 |
| 7,648,247 B2 * | 1/2010 | Ogawa et al. | 353/119 |
| 2004/0189953 A1 | 9/2004 | Wu et al. | |
| 2006/0061734 A1 * | 3/2006 | Tanaka | 353/33 |
| 2007/0019164 A1 * | 1/2007 | Nakagawa et al. | 353/20 |
| 2007/0019168 A1 | 1/2007 | Nakagawa et al. | |
| 2007/0047052 A1 * | 3/2007 | Nakano et al. | 359/237 |
| 2007/0097680 A1 * | 5/2007 | Cao et al. | 362/231 |
| 2008/0055561 A1 * | 3/2008 | Lv et al. | 353/58 |

FOREIGN PATENT DOCUMENTS

| | | |
|---|---|---|
| CN | 1900816 | 1/2007 |
| JP | 09-319007 A | 12/1997 |
| JP | 2005-346019 A | 12/2005 |
| JP | 2006-079032 A | 3/2006 |
| JP | 2006-208454 A | 8/2006 |
| JP | 2006-235317 A | 9/2006 |

* cited by examiner

*Primary Examiner* — Georgia Y Epps
*Assistant Examiner* — Sultan Chowdhury
(74) *Attorney, Agent, or Firm* — Canon USA Inc. IP Division

(57) ABSTRACT

A cooling device which prevents ambient persons from being exposed to an unpleasant feeling as much as possible by properly controlling an exhausting direction of the air which is used for cooling and exhausted from a chassis and an image projection apparatus having the cooling device are obtained. The cooing device cools first and second members to be cooled provided in the chassis, has first and second exhaust fans for guiding winds which have cooled the respective first and second members to an outside of the chassis, and is characterized in that the first and second exhaust fans are arranged so as to face the same surface of the chassis and the winds exhausted from the first and second exhaust fans are mixed.

8 Claims, 6 Drawing Sheets

COOLING DEVICE AND IMAGE PROJECTION APPARATUS HAVING THE SAME

BACKGROUND OF THE INVENTION

1. Field of the Invention

The present invention relates to a cooling device suitable for cooling component parts in a chassis in an image projection apparatus (liquid crystal projector) or the like in which light modulated by an image display element, such as a liquid crystal panel, is projected onto a projection surface by a projection optical system, thereby displaying an image.

2. Description of the Related Art

In a liquid crystal projector, a lamp for illuminating a liquid crystal panel, the liquid crystal panel which is illuminated by a light beam from the lamp, a power source for driving the lamp, and the like are provided in one chassis.

In order to brighten a projected image, it is desirable to illuminate the liquid crystal panel by using the high-output lamp. However, calorific values of the high-output lamp, the liquid crystal panel which is illuminated by the high-output lamp, the power source for driving the lamp, and the like increases, so that a temperature of each member rises.

Therefore, in order to cool those members enclosed in the chassis, a cooling device is provided for an image projection apparatus.

For example, in the cooling device for cooling the lamp, the lamp is cooled by blowing the wind from a fan to the lamp or by allowing the wind to pass through the lamp by using intake air of the fan.

The air which has cooled the lamp whose temperature becomes very high becomes the high-temperature wind and is exhausted to the outside of the image projection apparatus (outside of the chassis) (refer to U.S. Pat. No. 6,481,854). On the other hand, since the calorific values of the liquid crystal panel, the power source for driving the lamp, and the like are smaller than that of the lamp, the air which has cooled those members becomes the relatively-low-temperature wind and is exhausted to the outside of the chassis.

When the image projection apparatus is used, there is a case where persons who are seated around the image projection apparatus are exposed to the high-temperature wind which has circulated through the lamp. If the persons are exposed to the high-temperature wind, they feel unpleasant. Therefore, in the case of exhausting the wind which has cooled the lamp and the like from the chassis, it is important to properly set exhaust directions of the high-temperature wind and the low-temperature wind.

As a cooling device for cooling the lamp and the power source for driving the lamp, there has been known a construction in which the wind is allowed to flow the circumference of the lamp, the power source, and the like by using a plurality of exhaust fans arranged in parallel in an image projecting direction, thereby exhausting the wind to the outside of the image projection apparatus (Japanese Patent Application Laid-Open No. 2006-235317).

However, in a presentation using the image projection apparatus, a viewer is often seated in the direction of a side surface of the image projection apparatus (direction perpendicular to the image projecting direction). Therefore, according to the projection apparatus disclosed in Japanese Patent Application Laid-Open No. 2006-235317, there is a case where the viewer is exposed to the high-temperature wind from the exhaust fans arranged on the side surface of the image projecting direction.

A construction in which the wind is allowed to flow to the circumference of the lamp and the like by using a plurality of exhaust fans arranged in the direction perpendicular to the image projecting direction, thereby exhausting the wind to the outside of the image projection apparatus has been known (Japanese Patent Application Laid-Open No. 2006-208454). According to the image projection apparatus, a viewer who exists in the direction on the side surface of the image projecting direction is not directly exposed to the high-temperature wind. However, when the high-temperature wind is exhausted in the same direction as the image projecting direction, since the high-temperature wind enters an area where the projection light passes, a fluctuation of the projected image occurs.

A cooling device in which a direction of a wind which cools members such as a lamp and the like are is exhausted can be changed by a duct so that an explainer or a viewer is not directly exposed to a high-temperature wind exhausted from a chassis has been known (Japanese Patent Application Laid-Open No. H09-319007). However, it is necessary to newly provide the duct for changing the direction of the exhaust wind, an external appearance is deteriorated, and a construction increases in size.

SUMMARY OF THE INVENTION

It is an object of the invention to provide a cooling device which prevents ambient persons from being affected by an unpleasant feeling as much as possible by properly setting a direction of a wind exhausted from a chassis and to provide an image projection apparatus having the cooling device.

According to the invention, there is provided a cooling device for cooling a first member to be cooled and a second member to be cooled which are provided in a chassis, comprising: a first exhaust fan which guides a wind that has cooled the first member to be cooled to an outside of the chassis; and a second exhaust fan which guides a wind that has cooled the second member to be cooled to the outside of the chassis, wherein the first and second exhaust fans are arranged so as to face the same surface of the chassis, and the wind which is exhausted from the first exhaust fan and the wind which is exhausted from the second exhaust fan are mixed.

Further features of the present invention will become apparent from the following description of exemplary embodiments with reference to the attached drawings.

DESCRIPTION OF THE EMBODIMENTS

A cooling device of the invention can be applied to various apparatuses in which it is necessary to cool a plurality of members in a chassis. An example in which the cooling device of the invention is applied to an image projection apparatus will be described hereinbelow.

Embodiment 1

Figure 1:
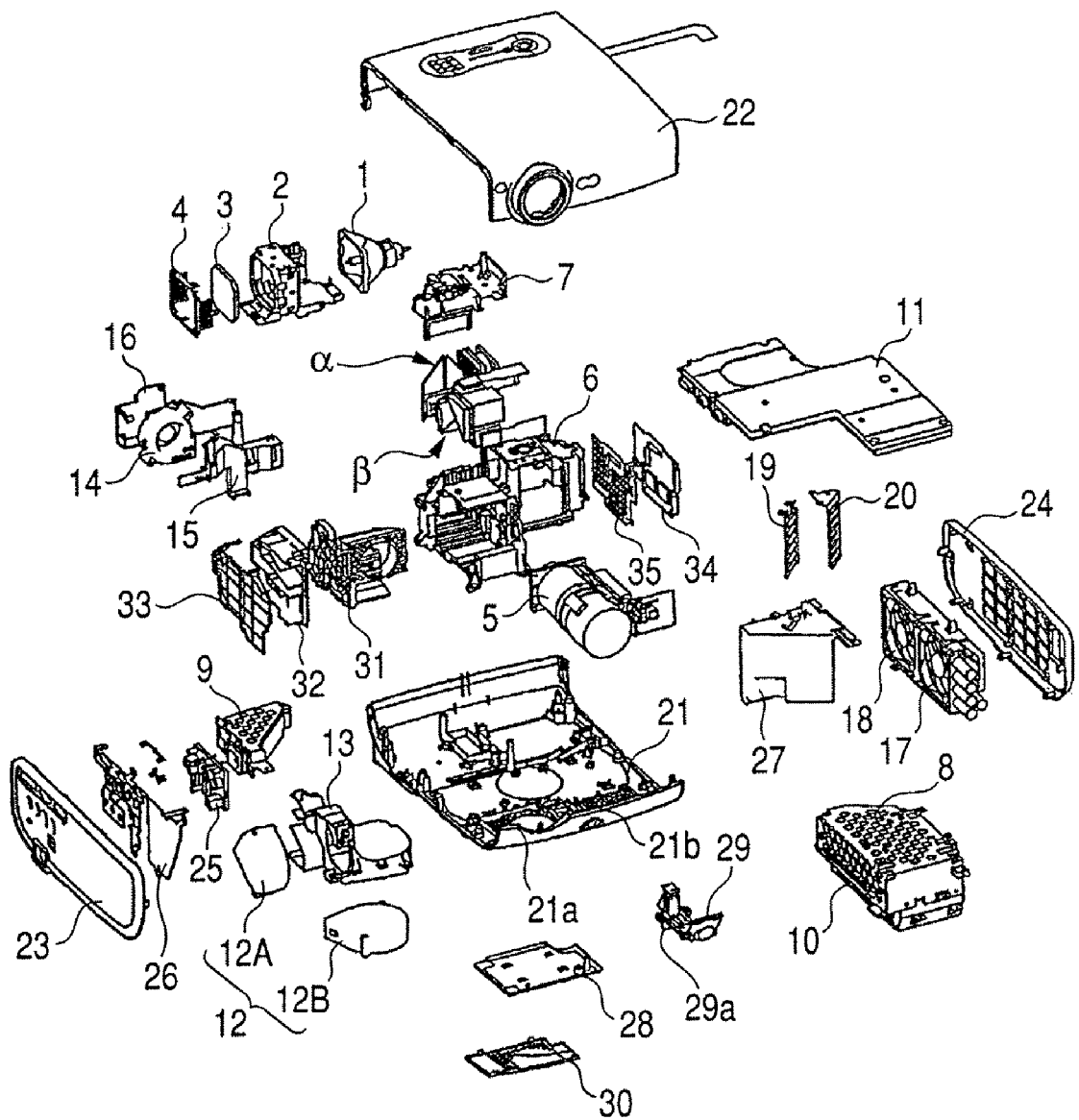
FIG. 1 is an exploded view of an image projection apparatus having a cooling device according to an embodiment 1 of the invention.

FIG. 1 is an exploded view of the image projection apparatus having the cooling device according to an embodiment 1 of the invention.

A lamp 1 is provided as a light source of the image projection apparatus. A lamp holder 2 holds the lamp 1. Explosion-proof glass 3 is arranged on an emission side of the lamp 1. A glass pressing member 4 is provided for the explosion-proof glass 3.

An illumination optical system α is provided for allowing light emitted from the lamp 1 to a liquid crystal panel (image display element) side. A color separation/combination optical system β has liquid crystal panels which the light from the illumination optical system α enters and which correspond to colors of R (red), G (green), and B (blue), respectively.

The light from the color separation/combination optical system β enters a projection lens barrel 5. The projection lens barrel 5 has a function for projecting an image onto a screen (projection surface). A projection optical system, which will be described hereinafter, is enclosed in the projection lens barrel 5. The lamp 1, illumination optical system α, and color separation/combination optical system β are enclosed in an optical box 6. The projection lens barrel 5 is fixed to the optical box 6. A lamp casing portion which surrounds the circumference of the lamp 1 is formed in the optical box 6.

An optical box cover 7 is provided to enclose the illumination optical system α and the color separation/combination optical system β into the optical box 6 and cover the optical box 6. A power source 8 and a power source filter 9 are provided. A ballast power supply 10 is combined with the power source 8 and is used to turn on the lamp 1. A circuit substrate 11 drives the liquid crystal panels by an electric power from the power source 8 and sends a turn-on command of the lamp 1. A cooling fan (member cooling fan serving as a second cooling fan) 12 sucks the air from an air inlet 21a of a sheathing casing (chassis) 21, which will be described hereinafter, thereby cooling optical elements such as liquid crystal panels in the color separation/combination optical system β.

A duct 13 feeds the wind caused by the cooling fan 12 to the optical elements such as liquid crystal panels in the color separation/combination optical system β.

A cooling fan (lamp cooling fan serving as a first cooling fan) 14 feeds a blowing wind to the lamp 1 and cools the lamp 1.

Ducts 15 and 16 hold the lamp cooling fan 14 and feed a cooling wind to the lamp 1.

An exhaust fan (intra-chassis exhaust fan serving as a second exhaust fan) 17 sucks the air from an air inlet 21b formed in the sheathing casing (chassis) 21, which will be described hereinafter, thereby circulating the wind in the power source 8 and the ballast power supply 10 and cooling them.

An exhaust fan (lamp exhaust fan serving as a first exhaust fan) 18 exhausts the wind which has been blown from the lamp cooling fan 14 and passed through the lamp 1.

Each of the lamp exhaust fan 18 and the intra-chassis exhaust fan 17 is constructed by an axial flow fan by which a large-airflow wind can be obtained.

Each of louvers 19 and 20 has a light block function for preventing the light from the lamp 1 from leaking to the outside of the apparatus.

The sheathing casing (chassis) 21 encloses the optical box 6 and the like. A sheathing casing cover (chassis cover) 22 encloses the optical box 6 and the like into the sheathing casing 21 and covering them.

The sheathing casing 21 has side plates (side plates of the chassis) 23 and 24 and is provided with the foregoing air inlets 21a and 21b formed therein. An exhaust port 24a is formed in the side plate 24 of the sheathing casing.

A connector for fetching various kinds of signals is attached to an interface substrate 25. An interface reinforce plate 26 is attached to the inside of the side plate 23 of the sheathing casing.

An exhaust box 27 guides heat of the lamp 1 to the lamp exhaust fan 18 in order to prevent the exhaust wind from being diffused into the apparatus. The exhaust box 27 holds the louvers 19 and 20.

A lamp cover 28 is removably provided on the bottom surface of the sheathing casing 21 and fixed by a screw (not shown).

An adjustment leg 29 is fixed to the sheathing casing 21. By adjusting a height of leg portion 29a of the adjustment leg 29, an inclination angle of the image projection apparatus can be adjusted.

An RGB air intake plate 30 presses a filter (not shown) which is attached to the outside of the air inlet 21a of the sheathing casing 21.

A prism base 31 holds the color separation/combination optical system β. A box side cover 32 is combined with a member 33, thereby forming a duct for guiding winds from cooling fans 12A and 12B.

An FPC (flexible printed circuit board) led out of the liquid crystal panel is connected to an RGB substrate (driving circuit substrate) 34 connected to the circuit substrate 11.

An RGB substrate cover 35 prevents the RGB substrate 34 from being affected by electric noises.

Figure 2A:
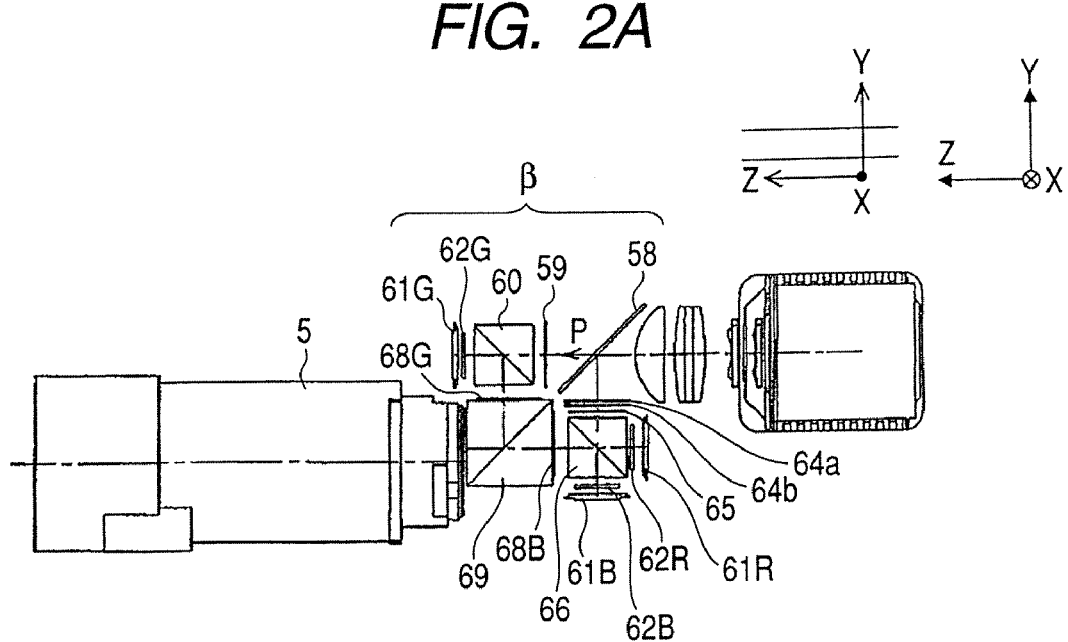
FIGS. 2A and 2B are optical constructional diagrams of the image projection apparatus having the cooling device of the embodiment 1 of the invention.
Figure 2B:
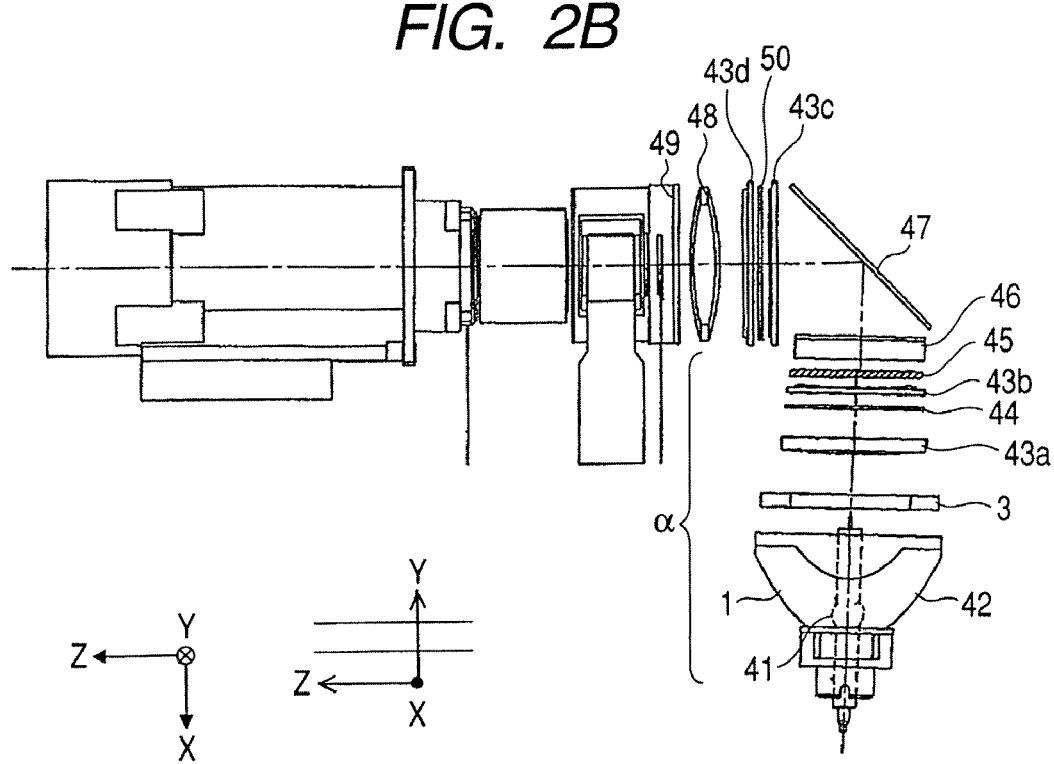

FIGS. 2A and 2B are a plan view and a side view of an optical construction of the image projection apparatus of FIG. 1, which is formed by the lamp 1, illumination optical system α, color separation/combination optical system β, and projection lens barrel 5. In the diagrams, the same component elements as those in FIG. 1 are designated by the same reference numerals.

In FIG. 2B, a light emission tube 41 emits white light having a continuous spectrum. A reflector 42 converges the light from the light emission tube 41. The lamp 1 is formed by the light emission tube 41 and the reflector 42.

A first cylindrical lens array 43a is constructed by a lens array having a refractive power only in the direction in the XZ plane.

A second cylindrical lens array 43b has a lens array corresponding to each lens of the first cylindrical lens array 43a. An ultraviolet absorption filter 44 is provided. A polarization conversion element 45 aligns unpolarized light into predetermined polarized light.

A front compressor 46 is constructed by a cylindrical lens having a refractive power only in the direction in the XY plane. A mirror 47 bends an optical axis by 88°. A third cylindrical lens array 43c is constructed by a lens array having a refractive power only in the direction in the YZ plane.

A fourth cylindrical lens array 43d has a lens array corresponding to each lens of the third cylindrical lens array 43c.

A color filter 50 transmits the color light in a specific wavelength band in order to adjust color coordinates to certain values. A condenser lens 48 is provided. A rear compressor 49 is constructed by a cylindrical lens having a refractive power only in the direction in the YZ plane.

Each of the foregoing members constructs one element of the illumination optical system α.

In FIG. 2A, a dichroic mirror 58 reflects the light of wavelength areas of the blue light (B) and the red light (R) and transmits the light of a wavelength area of the green light (G). An incident side polarization plate 59 for G is formed by adhering a polarization element onto a transparent substrate and transmits only the P-polarized light. A first polarization beam splitter 60 transmits P-polarized light, reflects S-polarized light, and has a polarization separation plane.

Each of a reflection-type liquid crystal display element (liquid crystal panel) 61R for red, a reflection-type liquid crystal display element (liquid crystal panel) 61G for green, and a reflection-type liquid crystal display element (liquid crystal panel) 61B for blue reflects the incident light and changes the polarizing direction of the light based on the image signal.

A ¼ λ wavelength plate 62R for red, a ¼ λ wavelength plate 62G for green, and a ¼ λ wavelength plate 62B for blue are provided. A trimming filter 64a returns the orange light to the lamp 1 side in order to raise color purity of R. An incident-side polarization plate 64b for the red and blue lights is formed by attaching a polarization element onto a transparent substrate and transmits only the P-polarized light. A color selection phase difference plate 65 converts the polarizing direction of the red light by 90° and does not convert the polarizing direction of the blue light. A second polarization beam splitter 66 transmits the P-polarized light, reflects the S-polarized light, and has a polarization separation plane.

An emission side polarization plate 68B for the blue light transmits only the S-polarized light with respect to the blue light. An emission side polarization plate 68G for the green light transmits only the S-polarized light. A dichroic prism 69 transmits the red and blue lights and reflects the green light.

As mentioned above, the color separation/combination optical system β is constructed by the dichroic mirror 58, the dichroic prism 69 and the members provided therebetween.

Although the polarization conversion element 45 in the embodiment converts the P-polarized light into the S-polarized light, the P-polarized light and the S-polarized light mentioned here are considered based on the polarization conversion element 45 as a reference. Since the light which enters the dichroic mirror 58 is considered based on the polarization beam splitters 60 and 66 as references, it is assumed that the P-polarized light enters the dichroic mirror 58. That is, although the light emitted from the polarization conversion element 45 is treated as the S-polarized light with reference to the polarization conversion element 45, it is treated as the P-polarized light with reference to the dichroic mirror when this light enters the dichroic mirror.

The optical operation will now be described.

The light emitted from the light emission tube 41 is converged by the reflector 42. Since the reflector 42 has a paraboloid shape, the light emitted from a focal point of the paraboloid becomes the light beams which are parallel to an axis of symmetry of the paraboloid. However, since a light source of the light emission tube 41 is not an ideal point but has a finite size, components of the light which is not parallel to the axis of symmetry of the paraboloid are also contained in the converged light beams.

The light beams enter the first cylindrical lens array 43a. The light beams which have entered the first cylindrical lens array 43a are divided into a plurality of light beams which is belt-shaped in the Y direction according to the respective cylindrical lenses and converged. The light beams enter the second cylindrical lens array 43b through the ultraviolet absorption filter 44. The light beams pass through the second cylindrical lens array 43b and a plurality of light beams which is belt-shaped in the Y direction is formed near the polarization conversion element 45.

The polarization conversion element 45 is constructed by a polarization separation plane, a reflection plane, and a ½ λ wavelength plate. A plurality of light beams enters the polarization separation plane corresponding to a column of those light beams and is divided into the light of the P-polarized light component which is transmitted and the light of the S-polarized light component which is reflected. The reflected light of the S-polarized light component is further reflected on the reflection plane and is emitted as S-polarized light as it is from the polarization conversion element. The transmitted light of the P-polarized light is transmitted through the ½ λ wavelength plate, converted into the S-polarized light, and thereafter, emitted from the polarization conversion element.

A plurality of light beams which is belt-shaped in the Y direction and has been polarization-converted by the polarization conversion element 45 passes through the front compressor 46, is reflected by the reflecting mirror 47 so as to be bent by 88°, and enters the third cylindrical lens array 43c. The light beams which have entered the third cylindrical lens array 43c are divided into a plurality of light beams which is belt-shaped in the X direction according to the respective cylindrical lenses and converged. After that, the light beams pass through the color filter 50 and the fourth cylindrical lens array 43d, become a plurality of light beams which is belt-shaped in the X direction, and travel to the condenser lens 48 and the rear compressor 49.

By the optical operations of the front compressor 46, condenser lens 48, and rear compressor 49, a plurality of light beams forms a rectangular uniform illumination area in such a form that rectangular images are overlaid. The reflection-type liquid crystal display elements 61R, 61G, and 61B, which will be described hereinafter, are arranged in the illumination area, respectively.

Subsequently, the light converted into the S-polarized light by the polarization conversion element 45 enters the dichroic mirror 58. The dichroic mirror 58 reflects the light of B (wavelength in a range between 430 nm and 495 nm) and the light of R (wavelength in a range between 590 nm 650 nm) and transmits the light of G (wavelength in a range between 505 nm and 580 nm).

Subsequently, an optical path of G will be described. The light of G which has been transmitted through the dichroic mirror 58 enters the incident side polarization plate 59. The light of G having been separated by the dichroic mirror 58 is still the P-polarized light (that is, the S-polarized light with reference to the polarization conversion element 45).

The light of G is emitted from the incident side polarization plate 59, enters the first polarization beam splitter 60 as P-polarized light, is transmitted through the polarization separation plane, and travels to the reflection-type liquid crystal display element 61G for green. In the reflection-type liquid crystal display element 61G for green, the light of G is modulated based on the image signal and reflected.

The P-polarized light component in the reflected light of G which has been modulated based on the image signal is again transmitted through the polarization separation plane of the first polarization beam splitter 60 and is returned to the lamp 1 side. The S-polarized light component in the reflected light of G modulated based on the image signal is reflected on the polarization separation plane of the first polarization beam splitter 60 and travels toward the dichroic prism 69.

At this time, a slow axis of the ¼ λ wavelength plate 62G provided between the first polarization beam splitter 60 and the reflection-type liquid crystal display element 61G for G has been adjusted to a predetermined direction.

Thus, an influence of a disturbance of polarization states which are caused in the first polarization beam splitter 60 and the reflection-type liquid crystal display element 61G for G can be suppressed.

The light of G emitted from the first polarization beam splitter 60 enters the dichroic prism 69 as S-polarized light, is reflected by the dichroic film surface of the dichroic prism 69, and travels to a projection lens 70.

The light of R and the light of B which were reflected by the dichroic mirror 58 enter the incident side polarization plate 64b.

The light of R and the light of B having been separated by the dichroic mirror 58 are still the P-polarized light. After the orange light was cut out by the trimming filter 64a, the light of R and the light of B enter the color selection phase difference plate 65 through the incident side polarization plate 64b.

The color selection phase difference plate 65 has a function for rotating the polarizing direction of only the light of R between the light of R and B by 90°. Thus, the light of R enters the second polarization beam splitter 66 as S-polarized light and the light of B enters the second polarization beam splitter 66 as P-polarized light. The light of R which entered the second polarization beam splitter 66 as S-polarized light is reflected by a polarization separation plane of the second polarization beam splitter 66 and travels to the reflection-type liquid crystal display element 61R for R.

The light of B which entered the second polarization beam splitter 66 as P-polarized light is transmitted through the polarization separation plane of the second polarization beam splitter 66 and travels to the reflection-type liquid crystal display element 61B for B.

The light of R which entered the reflection-type liquid crystal display element 61R for R is modulated based on the image signal and reflected. The S-polarized light component in the reflected light of R which has been modulated based on the image signal is again reflected by the polarization separation plane of the second polarization beam splitter 66 and is returned to the lamp 1 side.

The P-polarized light component in the reflected light of R modulated based on the image signal is transmitted through the polarization separation plane of the second polarization beam splitter 66 and travels toward the dichroic prism 69 as projection light.

The light of B which entered the reflection-type liquid crystal display element 61B for B is modulated based on the image signal and reflected. The P-polarized light component in the reflected light of B which has been modulated based on the image signal is again transmitted through the polarization separation plane of the second polarization beam splitter 66 and is returned to the lamp 1 side.

The S-polarized light component in the reflected light of B modulated based on the image signal is reflected by the polarization separation plane of the second polarization beam splitter 66 and travels toward the dichroic prism 69.

At this time, by adjusting the slow axes of the ¼ wavelength plates 62R and 62B provided between the second polarization beam splitter 66 and the reflection-type liquid crystal display elements 61R and 61B for R and B, an influence of a disturbance of a polarization state which is caused in each of the reflection-type liquid crystal display elements 61R and 61B can be suppressed.

The light of B between the projection light of R and B which have been combined to one light beam and emitted from the second polarization beam splitter 66 is polarized by the emission side polarization plate 68B and enters the dichroic prism 69. The light of R is transmitted through the emission side polarization plate 68B as P-polarized light as it is and enters the dichroic prism 69.

Since the light of B is polarized by the emission side polarization plate 68B, invalid components in the light of B that are contained during transmitting through the second polarization beam splitter 66, the reflection-type liquid crystal display element 61B for B. and the ¼ λ wavelength plate 62B are removed.

The projection light of R (P-polarized light) and the projection light of B (S-polarized light) which entered the dichroic prism 69 are transmitted through the dichroic film of the dichroic prism 69, are combined with the light of G (S-polarized light) reflected by the foregoing dichroic film, and travel to the projection lens barrel 5.

The combined projection light of R, G, and B is projected onto a projection surface such as a screen by the projection lens barrel 5.

Since the optical paths have been described above with respect to the case where the reflection-type liquid crystal display elements perform the white display, optical paths in the case where the reflection-type liquid crystal display elements perform the black display will now be described hereinbelow.

First, the optical path of G will be described. The P-polarized light of the light of G which has been transmitted through the dichroic mirror 58 enters the incident side polarization plate 59. After that, the P-polarized light enters the first polarization beam splitter 60, is transmitted through the polarization separation plane, and travels to the reflection-type liquid crystal display element 61G for G.

However, since the reflection-type liquid crystal display element 61G performs the black display, the light of G is reflected without being modulated based on the image signal. Therefore, since the light of G having been reflected on the reflection-type liquid crystal display element 61G is still the P-polarized light, it is again transmitted through the polarization separation plane of the first polarization beam splitter 60, is transmitted through the incident side polarization plate 59, and is returned to the lamp 1 side.

Subsequently, the optical paths of R and B will be described. The P-polarized light of each of the light of R and B reflected by the dichroic mirror 58 enters the incident side polarization plate 64b. Each of the light of R and B enters the color selection phase difference plate 65 through the incident side polarization plate 64b.

The color selection phase difference plate 65 has a function for rotating the polarizing direction of only the light of R between the light of R and B by 90°. Thus, the light of R becomes the S-polarized light and enters the second polarization beam splitter 66, and the light of B becomes the P-polarized light and enters the second polarization beam splitter 66.

The light of R which entered the second polarization beam splitter 66 as S-polarized light is reflected by the polarization separation plane of the second polarization beam splitter 66 and travels to the reflection-type liquid crystal display element 61R for R.

The light of B which entered the second polarization beam splitter 66 as P-polarized light is transmitted through the polarization separation plane of the second polarization beam splitter 66 and travels to the reflection-type liquid crystal display element 61B for B.

Since the reflection-type liquid crystal display element 61R for R performs the black display, the light of R which entered the reflection-type liquid crystal display element 61R for R is reflected without being modulated based on the image signal. Therefore, since the light of R having been reflected by the reflection-type liquid crystal display element 61R for R is still the S-polarized light, it is again reflected by the polarization separation plane of the second polarization beam splitter 66, passes through the incident side polarization plate 64b, and is returned to the lamp 1 side.

Since the reflection-type liquid crystal display element 61B for B performs the black display, the light of B of the P-polarized light which entered the reflection-type liquid crystal display element 61B for B is reflected without being modulated based on the image signal. Therefore, since the light of B reflected by the reflection-type liquid crystal display element 61B for B is still the P-polarized light, it is again transmitted through the polarization separation plane of the second polarization beam splitter 66 and is converted into the P-polarized light by the color selection phase difference plate 65. The light of B is transmitted through the incident side polarization plate 64b, is returned to the lamp 1 side, and is removed from the projection light.

In this manner, the optical construction of the projection type image display apparatus using the reflection-type liquid crystal display elements (reflection-type liquid crystal panels) is formed.

Transmission-type liquid crystal display elements may be used in place of the reflection-type liquid crystal display elements.

A detailed construction of the cooling device in the embodiment will now be described with reference to FIGS. 2A, 2B, 3, and 4.

The lamp cooling fan (first cooling fan) 14 for cooling the lamp 1 and the lamp exhaust fan (first exhaust fan) 18 for exhausting the wind in a relatively high temperature blown from the lamp cooling fan 14 and circulated through the lamp 1 are provided for the chassis 21. The member cooling fan (second cooling fan) 12 for sucking the air from the air inlet 21a provided on the chassis 21 and cooling the members to be cooled such as reflection-type liquid crystal display elements 61 and the like is also provided. Further, the intra-chassis exhaust fan (second exhaust fan) 17 for exhausting the wind in a relatively low temperature blown from the member cooling fan 12 and circulated in the members to be cooled to the outside of the chassis is provided.

The lamp exhaust fan 18 and the intra-chassis exhaust fan 17 are arranged so as to face the same surface of the side plate 24 of the chassis. Slits 24b are formed in the side plate 24 of the chassis. The wind ejected from the lamp exhaust fan 18 and the wind ejected from the intra-chassis exhaust fan 17 pass through the slits 24b.

A deflection unit 24c is provided on the side plate 24 of the chassis. When the wind is exhausted to the outside of the chassis through the slits 24b, the deflection unit 24c deflects the wind ejected from the lamp exhaust fan 18 so that the wind ejected from the lamp exhaust fan 18 and the wind ejected from the intra-chassis exhaust fan 17 are mixed.

Figure 3:
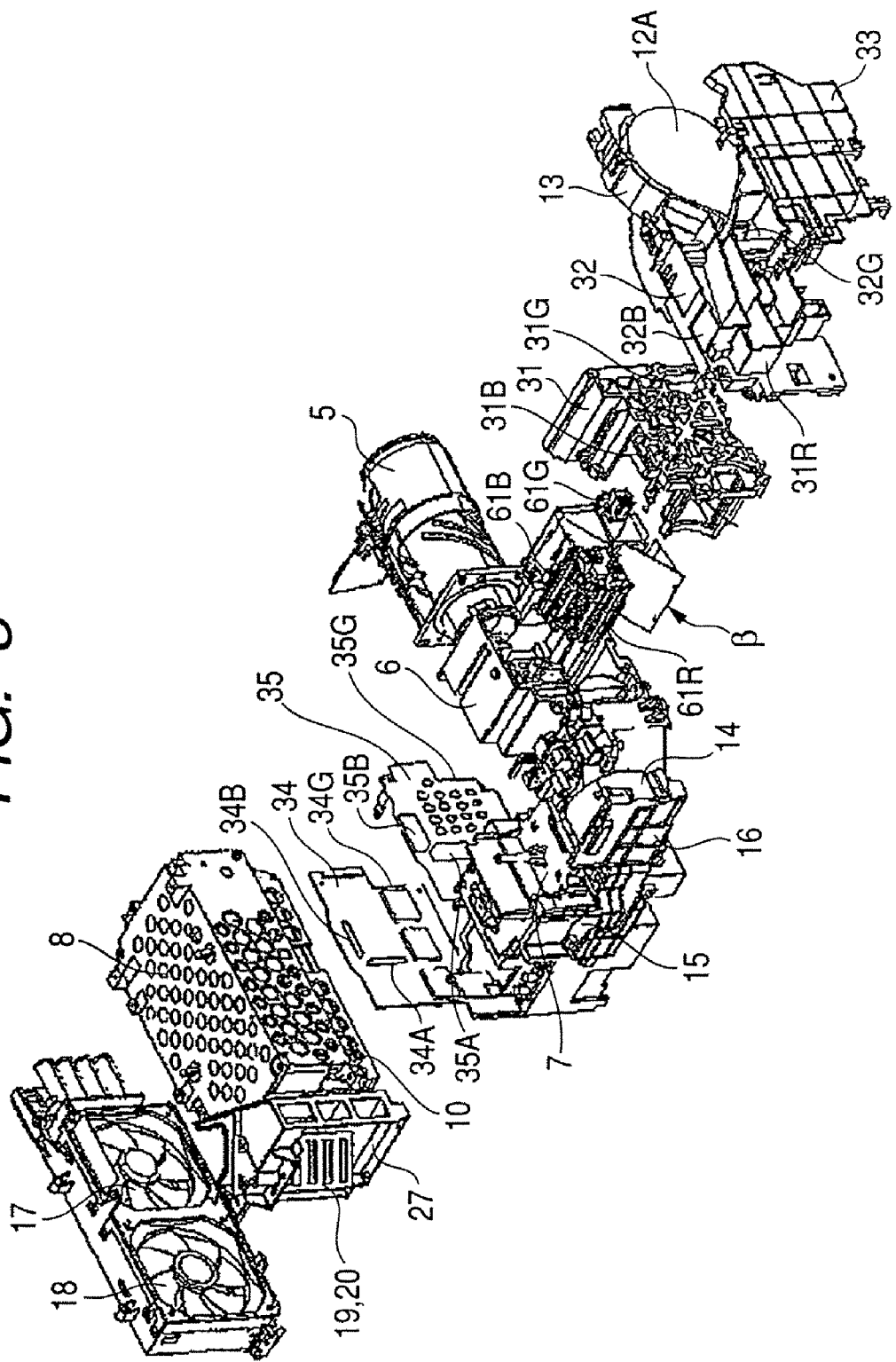
FIG. 3 is an exploded view of a part of the image projection apparatus having the cooling device of the embodiment 1 of the invention.
Figure 4:
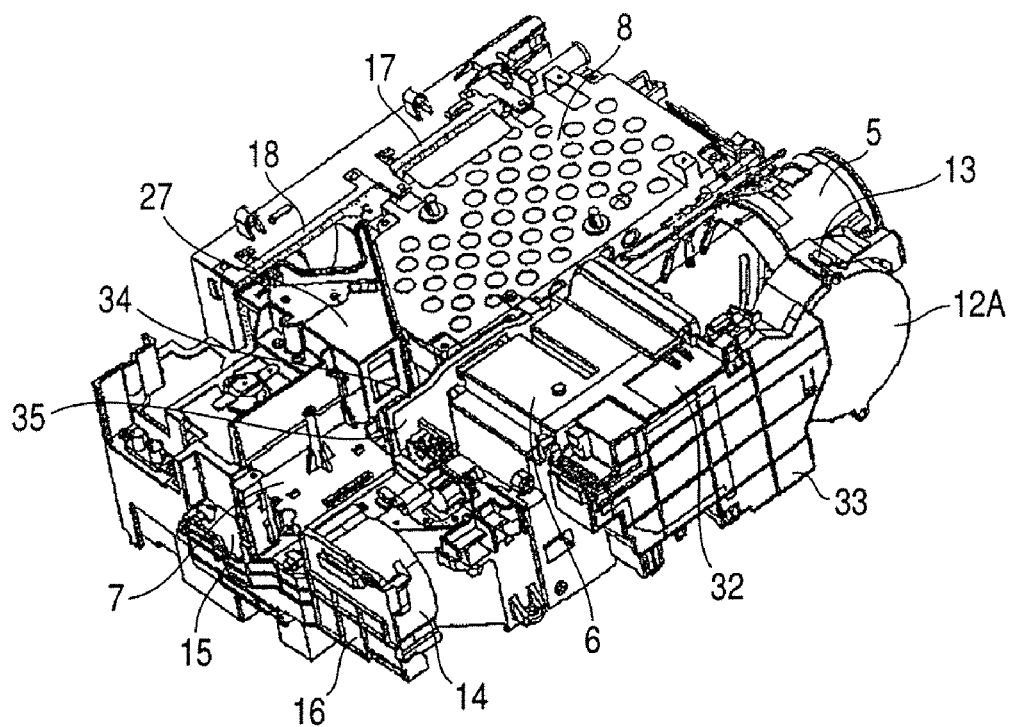
FIG. 4 is a perspective view of an internal structure of the image projection apparatus having the cooling device of the embodiment 1 of the invention.

In FIGS. 3 and 4, the member cooling fans 12A and 12B blow the cooling winds to the reflection-type liquid crystal display elements 61 in the color separation/combination optical system A, thereby cooling.

The winds blown out of the member cooling fans 12 flow to the box side cover 32 through the RGB duct 13 and are branched to blast ports 32R, 32G, and 32B through duct portions of the box side cover 32.

The winds from the blast ports 32R, 32G, and 32B pass through hole portions 31R, 31G, and 31B of the prism base 31 and are directed to the reflection-type liquid crystal display elements 61R, 61G, and 61B in the color separation/combination optical system β, respectively. As illustrated in FIGS. 2A and 2B, the winds which flow through the reflection-type liquid crystal display elements 61R, 61G, and 61B pass through portions including gaps of the polarization beam splitters 60 and 66 and pass through the optical box 6, respectively. Further, the winds pass through a hole portion 35A, a notched portion 35G, and a hole portion 35B of the RGB substrate cover 35 and pass through a hole portion 34A, a notched portion 34G, and a hole portion 34B of the RGB substrate (driving circuit substrate) 34, respectively.

When the winds blown out of the member cooling fans 12A and 12B pass through the hole portion 34A, notched portion 34G, and hole portion 34B of the RGB substrate (driving circuit substrate) 34, a wind speed becomes low.

However, the winds which have passed through the hole portion 34A, notched portion 34G, and hole portion 34B of the RGB substrate (driving circuit substrate) 34 are sucked by the intra-chassis exhaust fan 17, pass through hole portions of a cover of the power source 8 and ballast power supply 10, and flow to the intra-chassis exhaust fan 17 side.

Thus, the winds having cooled the members to be cooled in the chassis (the winds in a relatively low temperature although the temperature has risen) are exhausted to the outside of the chassis by the intra-chassis exhaust fan 17.

The wind from the lamp cooling fan 14 having cooled the light emission tube 41 of the lamp 1 is exhausted to the outside of the chassis by a sucking force of the lamp exhaust fan 18 as the wind in a relatively high temperature. The lamp exhaust fan 18 is configured so as to also exhaust the air in a high temperature around the reflector 42 to the outside of the chassis in order to cool the reflector 42 of the lamp 1. The temperature of the wind which is exhausted by the lamp exhaust fan 18 is higher than the temperature of the wind which is exhausted by the intra-chassis exhaust fan 17.

Subsequently, the directions of the winds which are exhausted from the intra-chassis exhaust fan 17 and the lamp exhaust fan 18 according to the embodiment will be described with reference to FIGS. 5 and 6.

Figure 5:
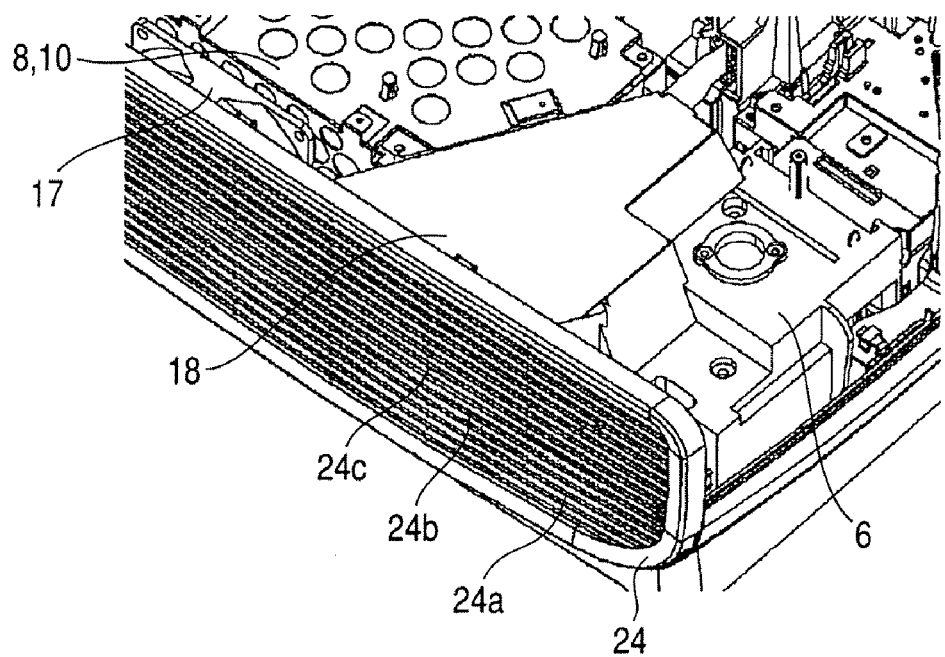
FIG. 5 is a perspective view of a part of the image projection apparatus having the cooling device of the embodiment 1 of the invention.
Figure 6:
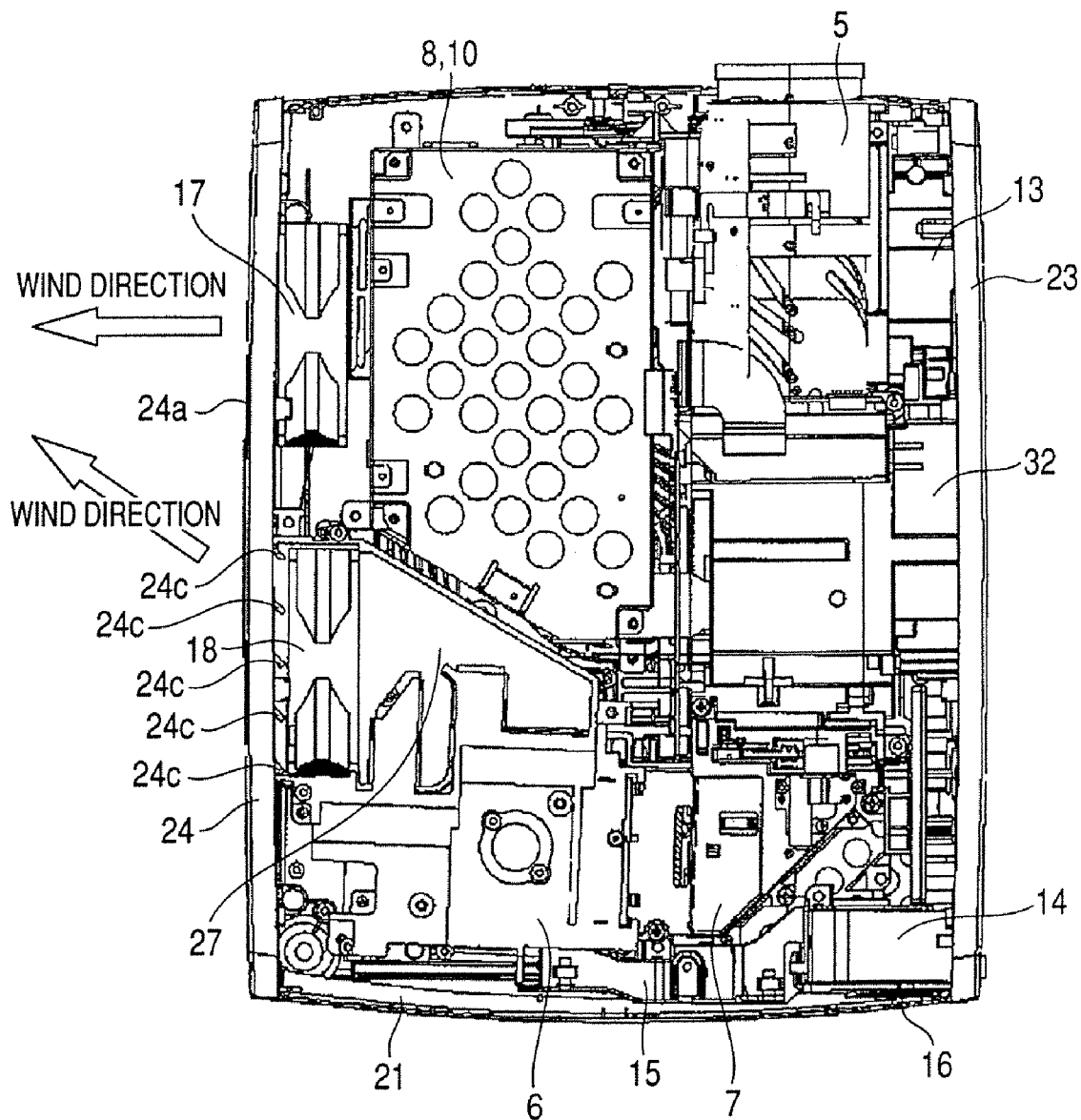
FIG. 6 is a plan view of the image projection apparatus having the cooling device of the embodiment 1 of the invention.

As illustrated in FIG. 5, the exhaust port 24a is formed in the side plate 24 of the chassis. The slits 24b are formed so as to continuously communicate with the exhaust areas of both of the intra-chassis exhaust fan 17 and the lamp exhaust fan 18. That is, the slits 24b extend in such a direction as to connect the exhaust area of the intra-chassis exhaust fan and the exhaust area of the lamp exhaust fan.

The winds which are exhausted from the intra-chassis exhaust fan 17 and the lamp exhaust fan 18 are exhausted from the chassis 21 through the slits 24b.

A plurality of ribs 24c is provided for the side plate 24 of the sheathing casing (chassis) in the vertical direction connecting the slits 24b. The ribs 24c are provided on the lamp-exhaust-fan 18 side and are formed serving as a deflection unit for deflecting the wind which is exhausted by the lamp exhaust fan 18. The ribs 24c (deflection unit) are provided so that the wind exhausted from the lamp exhaust fan 18 and the wind exhausted from the intra-chassis exhaust fan 17 are mixed.

Therefore, since the wind in the relatively high temperature exhausted from the lamp exhaust fan 18 is mixed with the wind in the relatively low temperature exhausted from the intra-chassis exhaust fan 17, the wind from the lamp exhaust fan 18 becomes the wind in the relatively low temperature and is exhausted.

Consequently, even if the explainer or the viewer is exposed to the wind exhausted from the chassis, the unpleasant feeling can be reduced as much as possible.

In the embodiment, the deflection unit 24c is provided in the side plate 24 on the lamp-exhaust-fan 18 side, thereby changing the direction of the wind. The invention is not limited to such a construction but the deflection unit 24c may be provided in the side plate 24 on the intra-chassis-exhaust-fan 17 side or can be also provided in the side plate 24 on the both sides of the intra-chassis exhaust fan 17 and the lamp exhaust fan 18. By this structure, the winds which are exhausted from the intra-chassis exhaust fan 17 and the lamp exhaust fan 18 can be mixed.

A position where the winds which are exhausted from both of the exhaust fans are mixed may be one of the inside of the chassis 21, the outside thereof, and the exhaust port 24a of the side plate 24 of the chassis.

As mentioned above, in the embodiment, the lamp exhaust fan and the intra-chassis exhaust fan are arranged so as to face the same surface of the chassis. The chassis has: the slits through which the winds exhausted from the lamp exhaust fan and the intra-chassis exhaust fan pass; and the deflection unit for allowing the wind exhausted from the lamp exhaust fan to be mixed with the wind exhausted from the intra-chassis exhaust fan. Therefore, the wind in the relatively low temperature which is exhausted from the intra-chassis exhaust fan and the wind in the relatively high temperature which is exhausted from the lamp exhaust fan can be mixed by the simple structure in which the deflection unit is provided in the side plate of the chassis. Thus, the image projection apparatus is obtained in which even if the explainer or the viewer is exposed to the winds exhausted from the exhaust fans, the unpleasant feeling can be reduced as much as possible.

The slits through which the winds exhausted from the lamp exhaust fan and the intra-chassis exhaust fan pass are formed in the chassis of the embodiment and are formed so as to continuously communicate with the exhaust areas of both of the lamp exhaust fan and the intra-chassis exhaust fan.

Thus, the wind which is exhausted from the intra-chassis exhaust fan and the wind which is exhausted from the lamp exhaust fan can be mixed by the simple structure without deteriorating an external appearance.

Embodiment 2

Figure 7:
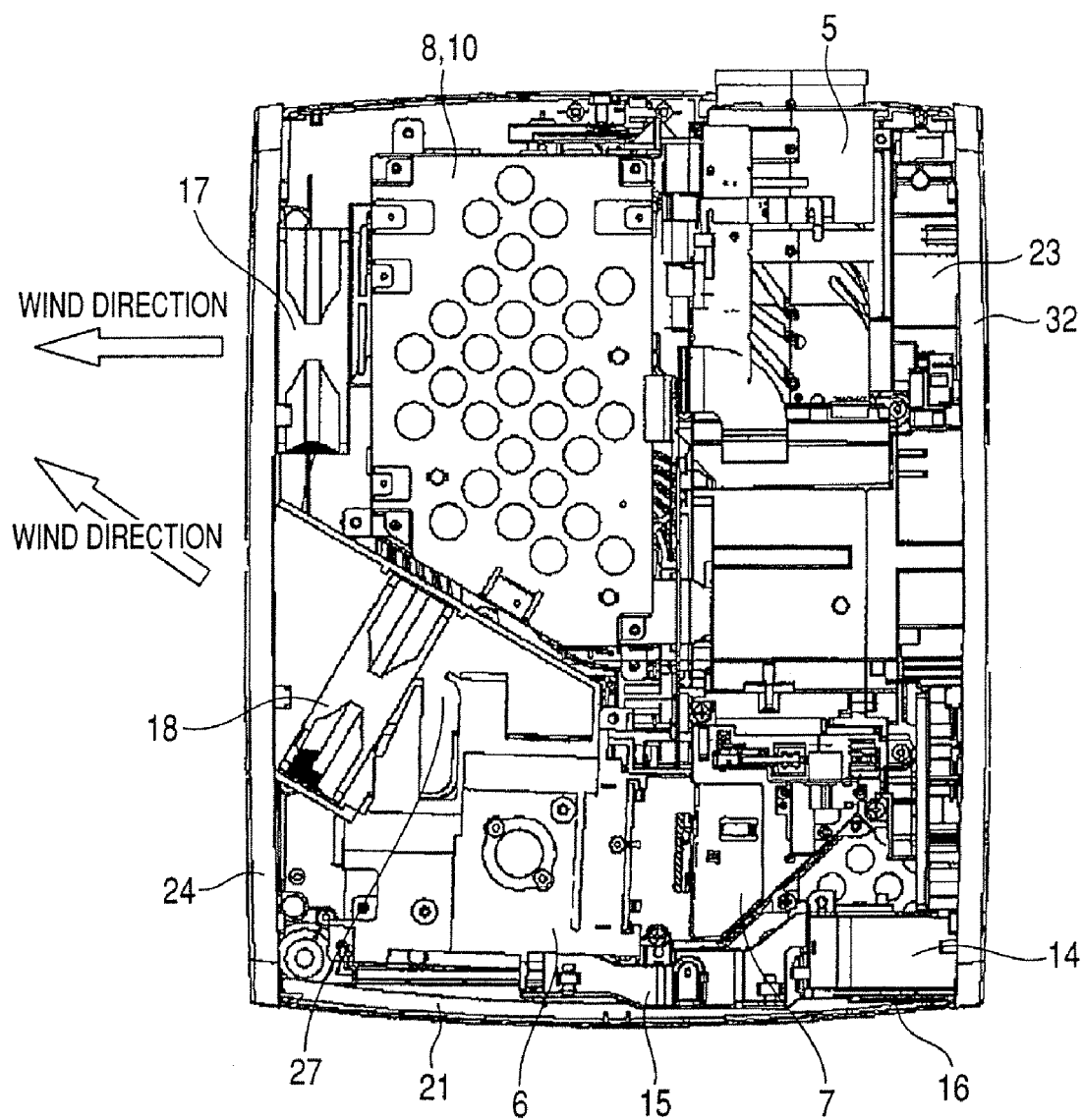
FIG. 7 is a plan view of an image projection apparatus having a cooling device of an embodiment 2 of the invention.

FIG. 7 is a plan view of an image projection apparatus having a cooling device of an embodiment 2 of the invention.

A description of portions having the same constructions as those in the embodiment 1 is omitted here.

The embodiment 2 differs from the embodiment 1 with respect to a point that the lamp exhaust fan 18 is arranged inclined with respect to the intra-chassis exhaust fan 17.

Since the lamp exhaust fan 18 is arranged inclined with respect to the intra-chassis exhaust fan 17, the winds which are exhausted from the intra-chassis exhaust fan 17 and the lamp exhaust fan 18 can be mixed without providing the deflection unit 24c in the side plate 24 of the chassis.

Also in this embodiment, each of the lamp exhaust fan 18 and the intra-chassis exhaust fan 17 is constructed by an axial flow fan by which a large airflow wind can be obtained.

Although the lamp exhaust fan 18 has been arranged inclined with respect to the side plate 24 of the chassis, it can be also arranged at any place so long as a construction in which the winds which are exhausted from the exhaust fans are mixed is used. A construction in which the intra-chassis exhaust fan 17 is inclined with respect to the side plate 24 of the chassis can be used.

In other words, it is sufficient that the exhaust fans are arranged in such a manner that a rotation axis of the lamp exhaust fan 18 and a rotation axis of the intra-chassis exhaust fan 17 are not parallel to each other but cross each other.

In the invention, however, it is not always necessary that the rotation axes of the exhaust fans cross perfectly but a case where the rotation axes of the exhaust fans have a twisted relation within a range where the winds from the exhaust fans are mixed is also incorporated.

As mentioned above, the wind in the relatively low temperature which is exhausted from the intra-chassis exhaust fan 17 and the wind in the relatively high temperature which is exhausted from the lamp exhaust fan 18 can be mixed by the simple structure in which the exhaust fans are merely arranged in such a manner that the rotation axes of the lamp exhaust fan 18 and the intra-chassis exhaust fan 17 cross each other.

By using such a cooling device, the image projection apparatus in which the unpleasant feeling caused by the winds which are exhausted from the exhaust fans is reduced can be constructed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-130311, filed May 16, 2007, which is hereby incorporated by reference herein in its entirety.

What is claimed is:

1. A cooling device which cools a first member to be cooled and a second member to be cooled which are provided in a chassis, comprising:
   a first exhaust fan which guides a wind that has cooled the first member to be cooled to an outside of the chassis;
   a second exhaust fan which guides a wind that has cooled the second member to be cooled to the outside of the chassis; and
   a deflection unit which deflects the wind which is exhausted from at least either the first exhaust fan or the second exhaust fan so that a direction of the wind which is exhausted from the first exhaust fan and a direction of the wind which is exhausted from the second exhaust fan cross each other,
   wherein the first exhaust fan and the second exhaust fan are arranged so as to face a same surface of the chassis and in parallel with respect to each other, and
   wherein the wind which is exhausted from the first exhaust fan and the wind which is exhausted from the second exhaust fan are mixed.

2. A cooling device according to claim 1, wherein both of the first exhaust fan and the second exhaust fan are axial flow fans.

3. A cooling device according to claim 1, further comprising:
   a first cooling fan which cools the first member to be cooled; and
   a second cooling fan which cools the second member to be cooled,
   wherein the first exhaust fan guides the wind which is exhausted from the first cooling fan and which has cooled the first member to be cooled to the outside of the chassis, and wherein the second exhaust fan guides the wind which is exhausted from the second cooling fan and which has cooled the second member to be cooled to the outside of the chassis.

4. A cooling device according to claim 1, wherein the chassis has slits through which the wind that is guided from the first exhaust fan to the outside of the chassis and the wind that is guided from the second exhaust fan to the outside of the chassis pass, and the slits extend in such a direction as to connect an exhaust area of the first exhaust fan and an exhaust area of the second exhaust fan.

5. A cooling device according to claim 1, wherein the first member to be cooled is a lamp.

6. A cooling device according to claim 5, wherein the second member to be cooled is a power source for driving the lamp.

7. A cooling device according to claim 5, wherein the second member to be cooled is an image display element which is illuminated by a light beam from the lamp.

8. An image projection apparatus, comprising:

the cooling device according to claim 1;

the lamp as the first member to be cooled;

the image display element which is illuminated by the light beam from the lamp; and a projection optical system which projects an image formed by the image display element to a projection surface.

* * * * *